United States Patent
Guethaus et al.

(10) Patent No.: US 7,689,222 B2
(45) Date of Patent: Mar. 30, 2010

(54) METHOD OF MANAGING USE OF CHANNELIZATION CODES DURING SOFT HANDOFF

(75) Inventors: Roland Johannes Guethaus, Schwaig (DE); Philip Charles Sapiano, Corsham (GB); Mirko Schacht, Nuremberg (DE)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1093 days.

(21) Appl. No.: 11/340,527

(22) Filed: Jan. 27, 2006

(65) Prior Publication Data

US 2007/0178902 A1 Aug. 2, 2007

(51) Int. Cl.
*H04W 36/00* (2009.01)
*H04W 4/00* (2009.01)

(52) U.S. Cl. ...................... 455/442; 370/331
(58) Field of Classification Search ................ 455/442, 455/436, 437, 438, 439, 443; 370/331
See application file for complete search history.

(56) References Cited

U.S. PATENT DOCUMENTS

| | | | | |
|---|---|---|---|---|
| 7,096,019 | B2 * | 8/2006 | Wang | 455/437 |
| 7,154,973 | B2 * | 12/2006 | Hanada et al. | 375/354 |
| 7,236,788 | B2 * | 6/2007 | Mohebbi | 455/437 |
| 2002/0162073 | A1 * | 10/2002 | Choi et al. | 714/779 |
| 2003/0114162 | A1 * | 6/2003 | Chheda et al. | 455/447 |
| 2005/0025096 | A1 * | 2/2005 | Vayanos et al. | 370/329 |
| 2006/0285521 | A1 * | 12/2006 | Steudle | 370/331 |
| 2007/0047489 | A1 * | 3/2007 | Bachl et al. | 370/331 |
| 2008/0153494 | A1 * | 6/2008 | Kazmi et al. | 455/436 |

FOREIGN PATENT DOCUMENTS

| | | |
|---|---|---|
| WO | WO 02/25839 | 3/2002 |
| WO | WO 2006/000876 | 1/2006 |

OTHER PUBLICATIONS

"F-DPCH Operation In SHO", TSG-RAN WG1#40 Meeting, TDOC R1-050151, 2005.
"3rd Generation Partnership Project; Technical Specification Group Radio Access Network; Radio Link Timing Adjustment (Release5)", 3GPP TR 25.878 V5.1.0 (Jun. 2002), © 2002.
"3rd Generation Partnership Project; Technical Specification Group Radio Access Network; Radio Link Timing Adjustment (Release6)", 3GPP TS 25.211 V6.7.0 (Dec. 2005), © 2005.

(Continued)

*Primary Examiner*—George Eng
*Assistant Examiner*—Christopher M Brandt
(74) *Attorney, Agent, or Firm*—Harness, Dickey & Pierce

(57) ABSTRACT

In one embodiment of managing the use of channelization codes during soft handoff of a mobile station from a transferring network station to a candidate network station, a determination is made as to whether a field associated with an existing channelization code used by the candidate network station is unused and meets timing criteria associated with a corresponding field received by the mobile station from the transferring network station. Based on this determination, a channelization code for use by the candidate network station in communicating with the mobile station is assigned.

14 Claims, 6 Drawing Sheets

OTHER PUBLICATIONS

"3$^{rd}$ Generation Partnership Project; Technical Specification Group Radio Access Network; Radio Link Timing Adjustment (Release6)", 3GPP TS 25.331 V6.8.0 (Dec. 2005), © 2005.

3GPP TSG RAN WG4: "CR (Rel-6) to 25.101 for the WI optimisatino of downlink channelisation code utilization"; Jun. 1, 2005-Jun. 3, 2005; pp. 1-4, XP002442285.

Nortell Networks: "Proposed work item on optimization of downlink channelisation code utilization"; Mar. 10, 2004-Mar. 13, 2004; pp. 1-3; XP002442286.

Nokia: "Way forward on F-DPCH"; Nov. 15, 2004-Nov. 19, 2004; pp. 1-3; XP002442287.

Nokia: "Soft handover requirement scenario for F-DPCH"; Aug. 29, 2005-Sep. 2, 2005; pp. 1-3; XP002442288.

International Search Report and Written Opinion issued in corresponding PCT Application Serial No. PCT/US2007/002256 and mailed on Jul. 31, 2007.

* cited by examiner

F-DPCH Slot format

Steps of 256 chips (10 users max)

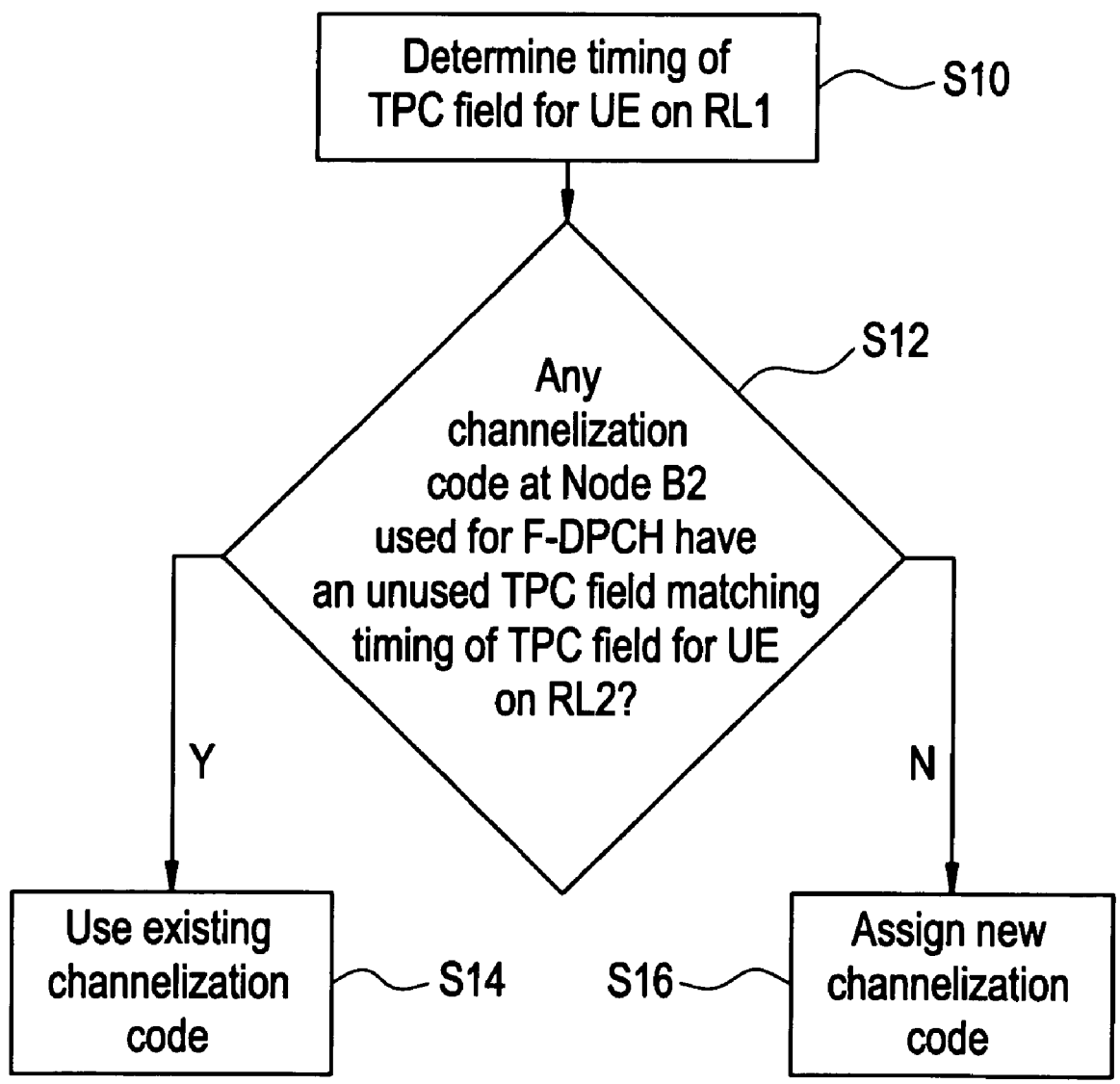

METHOD OF MANAGING USE OF CHANNELIZATION CODES DURING SOFT HANDOFF

BACKGROUND OF THE INVENTION

FIG. 1 illustrates a portion of a UMTS wireless communication network. As shown, user equipment UE wirelessly communicates with a Node-B serving the communication needs of a geographic area (often referred to as a cell or collection of cells). A UE may be a mobile phone, wireless equipped PDA, wireless equipped laptop, etc. UEs are also commonly called mobile stations or mobile units. Node Bs are network stations and are also commonly called base stations. Node-Bs communicate with a radio network controller (RNC), which may configure the UE and the Node B for communication over various channels.

As part of the release 6 versions of the 3GPP specifications, the feature of an F-DPCH (Fractional Dedicated Physical CHannel) has been incorporated. Currently, the 3GPP standard defines the usage of the F-DPCH as illustrated in FIG. 2A. FIG. 2A shows the F-DPCH slot format as opposed to the regular DPCCH (Dedicated Physical Control CHannel) slot format illustrated in FIG. 2B. As shown in FIG. 2B, the DPPCH slot format, during DTX (Discontinuous Transmission) periods indicated in FIG. 2A, includes TFCI (Transport Format Combination Indicator) and dedicated Pilot bits. By contrast, the F-DPCH carries control information; namely, transport power control bits (TPC) from, for example, the Node B to the UE. Namely, the F-DPCH may be used when all higher layer data, control and user plane, are mapped on the HS-DSCH transport channel, which was specified as part of the release 5 versions of the 3GPP specifications. The only information currently kept on F-DPCH are the TPC bits, which are dedicated to each user and are transmitted once per slot.

As shown in FIG. 2A, a slot of the F-DPCH has a length of 2560 chips that may be divided into ten fields of 256 chips each. By time-aligning the different F-DPCHs of different users (with step sizes of 256 chips), the DTX periods can be used to multiplex the TPC information of different UEs as depicted in FIG. 3. Accordingly, operation of the F-DPCH allows to time multiplex up to 10 users or UEs on a single channelization code; and therefore, makes more efficient use of the code resources compared to the operation on a DPCH (Dedicated Physical CHannel) in earlier releases, where one channelization code had to be utilized per user. Stated another way, a single channelization code may have ten fields, each supporting the F-DPCH of a different user. Thus, ten UEs can be served utilizing a single channelization code for the ten F-DPCHs instead of ten different channelization codes for all UE's F-DPCH.

However, channelization codes are not used for F-DPCHs in this manner for UEs or mobile stations in a soft handoff or handover operation. As is known, during soft handoff, the two or more Node Bs involved in the soft handoff attempt to maintain a timing alignment with respect to the UE. The process for effecting this synchronization is well known and described in, for example, 3GPP TR 25.878. However, even with the timing adjustments made to effect synchronization, drift does occur and the requirement that the TPC bits received from the two different Node Bs fall into a certain reception window (e.g., +/−148 chips) of the UE may not be met. Accordingly, one proposal suggests using an extra channelization code for each extra Node B to UE connection that results during soft handoff. Namely, if the soft handoff involves the original serving Node B and two candidate Node Bs, the RNC will assign two new channelization codes, one for each of the candidate Node Bs to use for F-DPCH transmissions to the UE.

SUMMARY OF THE INVENTION

The present invention provides a method for managing the use of channelization codes during soft handoff.

In one embodiment of managing the use of channelization codes during soft handoff of a mobile station, from a transferring network station to a candidate network station, a determination is made as to whether a field associated with an existing channelization code used by the candidate network station is unused and meets timing criteria associated with a corresponding field received by the mobile station from the transferring network station. Based on this determination, a channelization code for use by the candidate network station in communicating with the mobile station assigned.

For example, the existing channelization code is assigned if it is determined that a field associated with the existing channelization code used by the candidate network station is unused and meets timing criteria associated with the corresponding field received by the mobile station from the transferring network station. As another example, an unused channelization code is assigned for use by the candidate network station only if it is not determined that a field associated with the existing channelization code used by the candidate network station is unused and meets timing criteria associated with the corresponding field received by the mobile station from the transferring network station.

In one embodiment, the timing criteria is met if an unused field of the existing channelization code is received by the mobile station within a timing window established with respect to receipt of the corresponding field from the transferring network station. For example, the timing window may be +148 chips to −148 chips with respect to receipt of the corresponding field form the transferring network station.

In one embodiment, the candidate network station sends forward link communication channel data during the field of the existing channelization code if the assigning step assigns the existing channelization code. The forward link communication channel may be a Fractional Dedicated Physical Channel.

In another embodiment, timing of the field of the assigned channelization code that corresponds to the corresponding field received by the mobile station from the transferring network station is monitored to detect drift beyond an acceptable timing window with respect to the corresponding field. If drift beyond the acceptable timing window is detected, then the channelization code assignment process according to an embodiment of the present invention is repeated.

In yet another embodiment, whether one channelization code used by a candidate network station has an unused field that meets timing criteria associated with a corresponding used field of another used channelization code used by the candidate network is discriminated. The unused field of the one channelization code is then used instead of the used field of the another used channelization code such that the used field of the one channelization code becomes unused if the discriminating step determines that the another used channelization code has an unused field that meets timing criteria associated with a corresponding used field of the one channelization code.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein:

FIG. 5 illustrates a flow chart of a channelization code management process performed when soft handoff begins according to an embodiment of the present invention;

DETAILED DESCRIPTION OF THE EXAMPLE EMBODIMENTS

Figure 4:
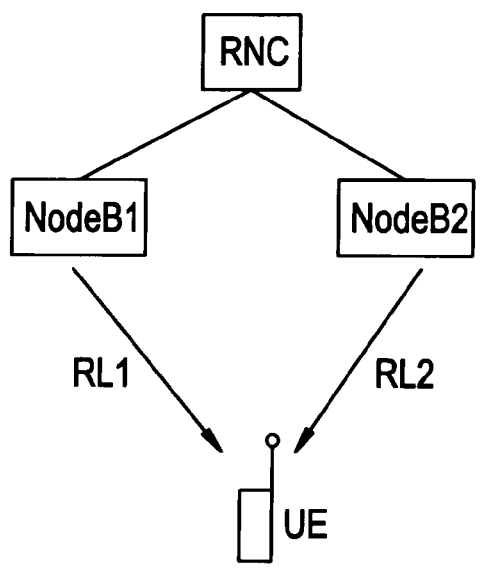
FIG. 4 illustrates an example of a UE in soft handoff or soft handover according to an embodiment of the present invention.

FIG. 4 illustrates an example of a UE or mobile station in soft handoff or soft handover according to an embodiment of the present invention. In this example, a first Node B1 originally serves the communication needs of a UE. Subsequently, the UE enters into a soft handoff operation in which responsibility for handling the communications needs of the UE is to be transferred from the first Node B1 to a second Node B2. The first Node B1 is often referred to as the transferring network station. The second Node B2 is often referred to as the candidate network station because the second Node B2 is a candidate to receive the mobile station. As is known, during soft handoff, there may be more than one candidate network station. The soft handoff process is well-known and will not be described in detail for the sake of brevity. Instead, the role of the RNC in managing the channelization codes during soft handoff according to embodiments of the present invention will be described in detail.

As shown in FIG. 4, the connection from the first Node B1 to the UE will be referred to as a first radio link RL1 and the connection from the second Node B2 to the UE will be referred to as a second radio link RL2.

Figure 1:
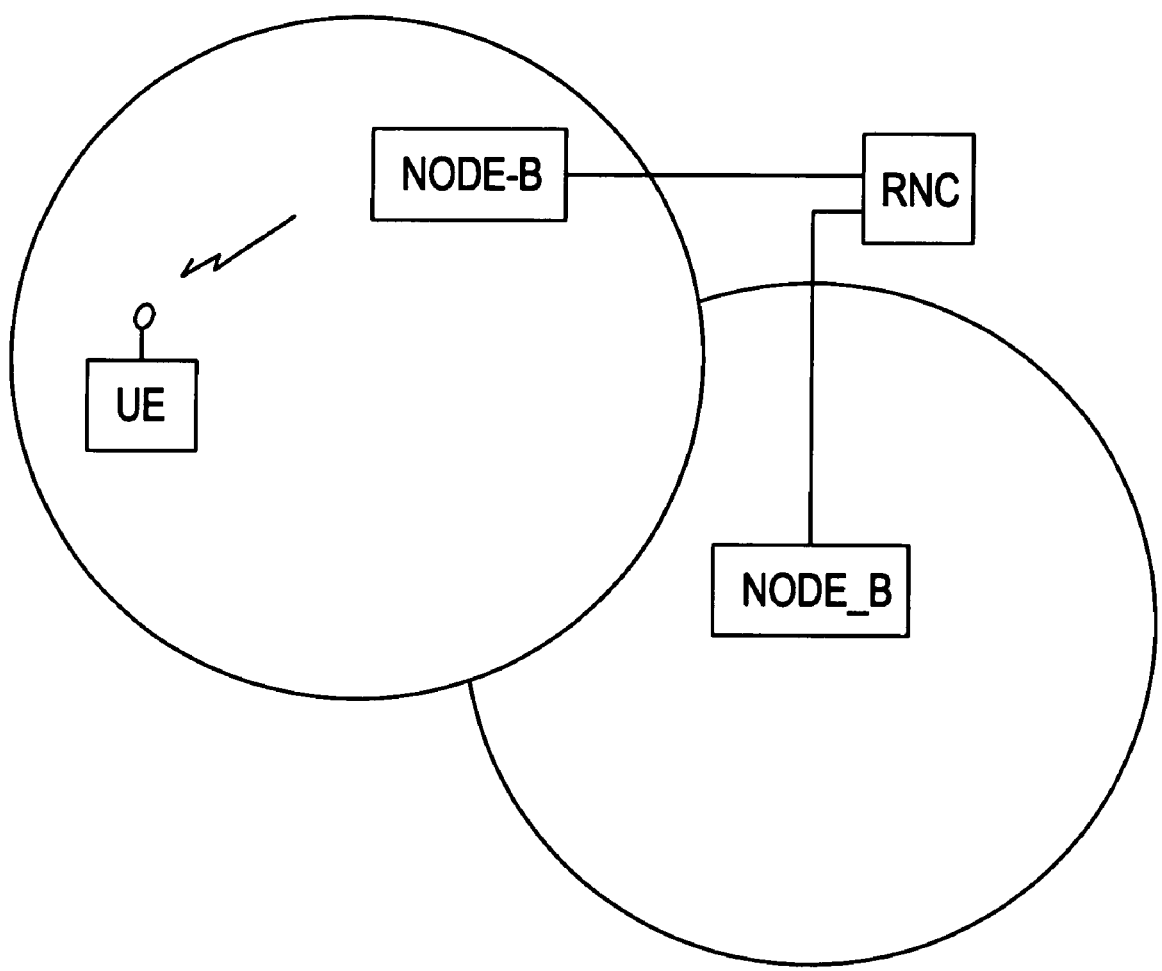
FIG. 1 illustrates a portion of a UMTS wireless communication network.
Figure 2A:
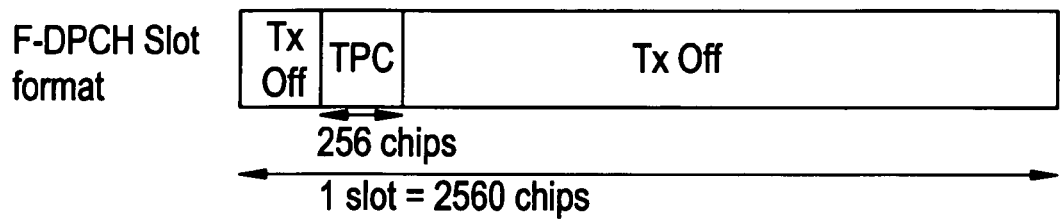
FIG. 2A illustrates a prior art slot format of a F-DPCH channel.
Figure 2B:
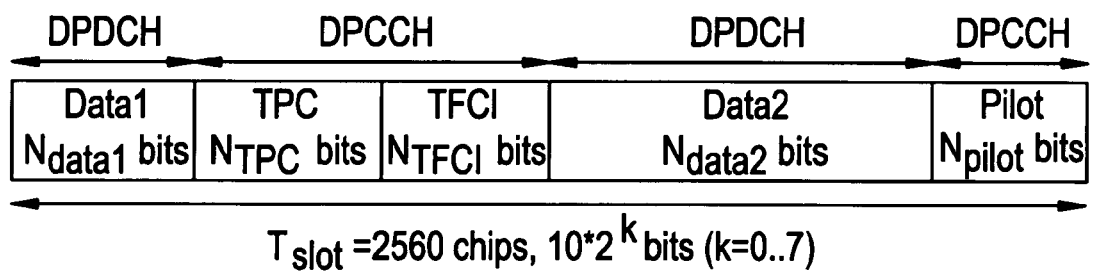
FIG. 2B illustrates a prior art slot format of a DPCH channel.
Figure 3:
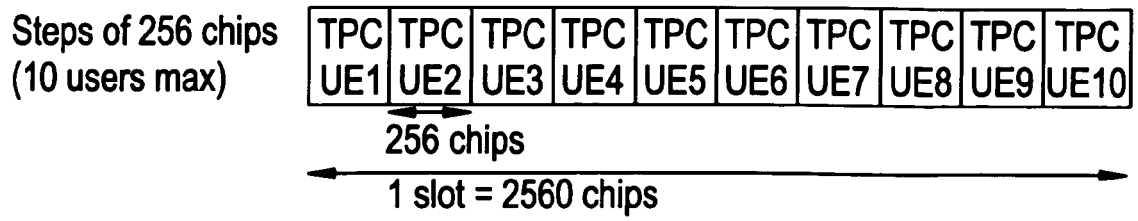
FIG. 3 illustrates a prior art time multiplexing of the F-DPCH channels for a number of UEs using a single channelization code.

According to an embodiment of the present invention, when the UE is in soft handoff as depicted in FIG. 4, a channelization code for the first radio link RL1 is configured to have multiplexed F-DPCH as shown in FIG. 3. Namely, the first Node B1, prior to the soft handoff, will have been operating according to the multiplexing format of FIG. 3. And, this format is maintained even though a mobile station served by the first Node B1 has entered soft handoff. Stated another way, the channelization code use and the F-DPCHs' time offsets of the transferring Node B remain unchanged.

The RNC, however, manages the multiplexing format of the second Node B2—the receiving Node B—such that the use of channelization codes is minimized.

As discussed above, during soft handoff, the RNC attempts to maintain a timing alignment between the first radio link RL1 and the second radio link RL2 with respect to the UE. For example, the F-DPCH transmission to the UE on the first radio link RL1 and the second radio link RL2 are synchronized. As further mentioned above, the process for effecting this synchronization is well known and described in, for example, 3GPP TR 25.878. However, even with the timing adjustments made to effect synchronization, drift does occur and the requirement that the TPC bits received from the two different Node Bs fall into a certain reception window (e.g., +/−148 chips) of the UE may not be met.

Accordingly, the RNC monitors whether or not this timing criterion is being met and manages the use of channelization codes for the F-DPCHs at the second Node B2 based on this monitoring. This management process will now be described in detail below with respect to FIGS. 5-8. FIG. 5 illustrates a flow chart of the channelization code management process performed by the RNC when the soft handoff operation begins. As shown, in step S10, the RNC determines the timing of the TPC field in the F-DPCH for the mobile station on RL1. Namely, the RNC may receive timing reports as is well-known, for example, as described in 3GPP TS 25.331.

Based on this timing information, in step S12, the RNC determines if the second Node B2 uses any existing channelization codes for F-DPCHs that have an unused PC field matching the timing of the TPC field for the UE on the first radio link RL1. The timing match occurs when the unused TPC field of the existing channelization code is received by the mobile station within a timing window (e.g., +/−148 chips) about the receipt of the TPC field by the mobile station on the first radio link RL1. If so, then the RNC instructs the second Node B2 to use the existing channelization code in sending the TPC field or the F-DPCH for the UE such that the TPC field on the second radio link RL2 matches the timing of the corresponding TPC field on the first radio link RL1. However, if no match is found, then in step S16, the RNC assigns the second Node B a new channelization code from a pool of unused channelization codes, and instructs the second Node B2 to use the new channelization code in sending the TPC field on the second radio link RL2 such that the timing of the TPC field of the second radio link RL2 matches the timing of the TPC field on the first radio link RL1.

Figure 8:
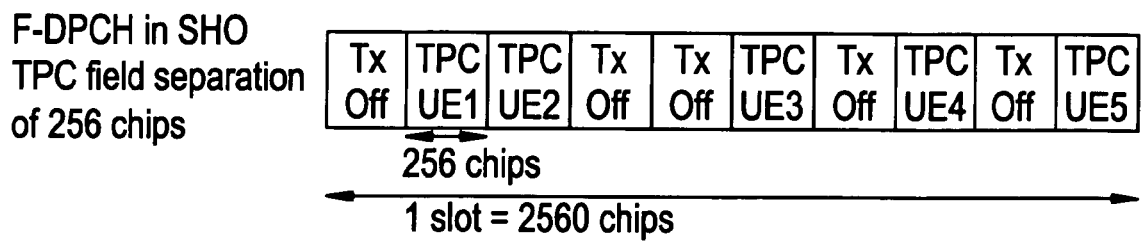
FIG. 8 illustrates time multiplexing of F-DPCH channels at a Node B involved in soft handover according to an embodiment of the present invention by an RNC.
Figure 6:
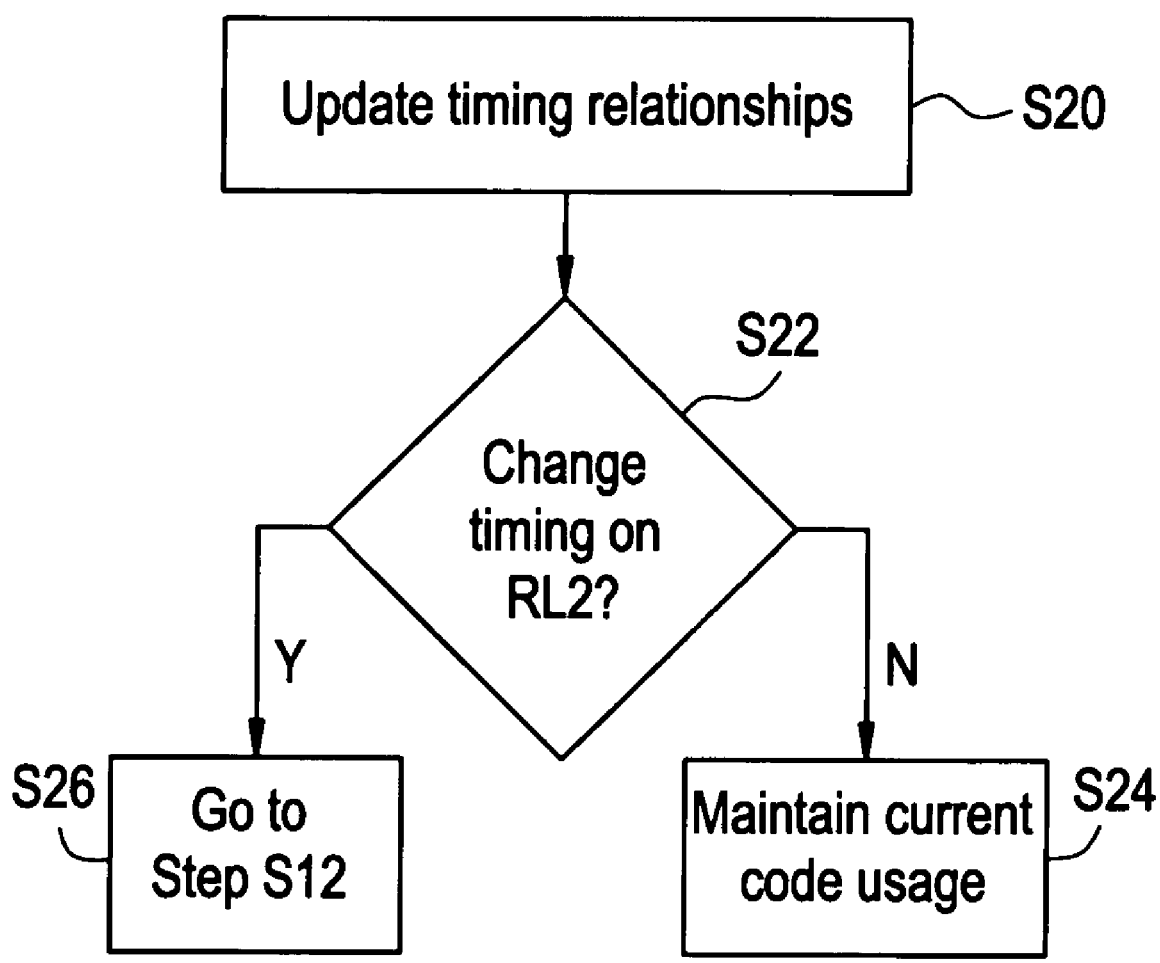
FIGS. 6-7 illustrate flow charts of channelization code management processes performed during soft handoff according to embodiments of the present invention.

As will be appreciated, if a match is found in step S12, then the number of channelization codes being used for F-DPCH transmission may be kept to a minimum during soft handoff. FIG. 8 illustrates an example of TPC fields for different UEs having the same channelization code on the second radio link RL2. As shown, in this example, five users are multiplexed onto one channelization code with some gaps of 256 chips between the TPC fields of some of the UEs. These gaps result if the reception windows of the UEs determined by the timing of the respective first radio links do not allow usage of the TPC fields for this channelization code.

As also will be appreciated, and as described above, after handoff has begun, drift of the synchronization between the TPC field on the first radio link RL1 and the TPC field on the second radio link RL2 for the UE may occur. Consequently, the RNC may need to change the channelization code and/or TPC field used on the second radio link RL2 for the UE. This update process is illustrated in the flow chart of FIG. 6. During soft handoff, the RNC receives updates in step S20 on the timing of the first and second radio links RL1 and RL2 in any well-known manner, for example, as set forth in TS 25.331. Based on this timing information, the RNC determines in step S22 if the timing of the F-DPCH for the UE on the second radio link RL2 should be changed. For example, the RNC may determine the timing difference between the TPC fields on the first and second radio links RL1 and RL2 (e.g., determine the drift), and if this timing difference exceeds a threshold amount, the RNC decides to change the timing of the F-DPCH for the UE on the second radio link RL2. Namely, if a change is decided, processing goes to step S12 of FIG. 5; wherein the RNC will assign a new unused TPC field of an existing channelization code or assign a new channelization code for the F-DPCH on the second radio link RL2. As will be appreciated, this may result in using a different TPC field with the same channelization code as presently used on the second radio link RL2, or may result in the use of a different existing channelization code. Also, this may result in a channelization code becoming unused. If so, then the channelization code is returned to the pool of unused channelization codes for future assignment. Returning to step S22, if no timing change is to be made, then the RNC maintains the use of the channelization code for the UE.

It will be further understood that the acceptable timing window (e.g., +/-the threshold value in the above example), does not need to be the same timing window used in step S12, but may be. Also, while both the timing window of step S12 and the timing window of step S22 were described as symmetrical with respect the TPC field received by the mobile station on the first radio link RL1, one or both of these timing windows may be asymmetrical.

Figure 7:
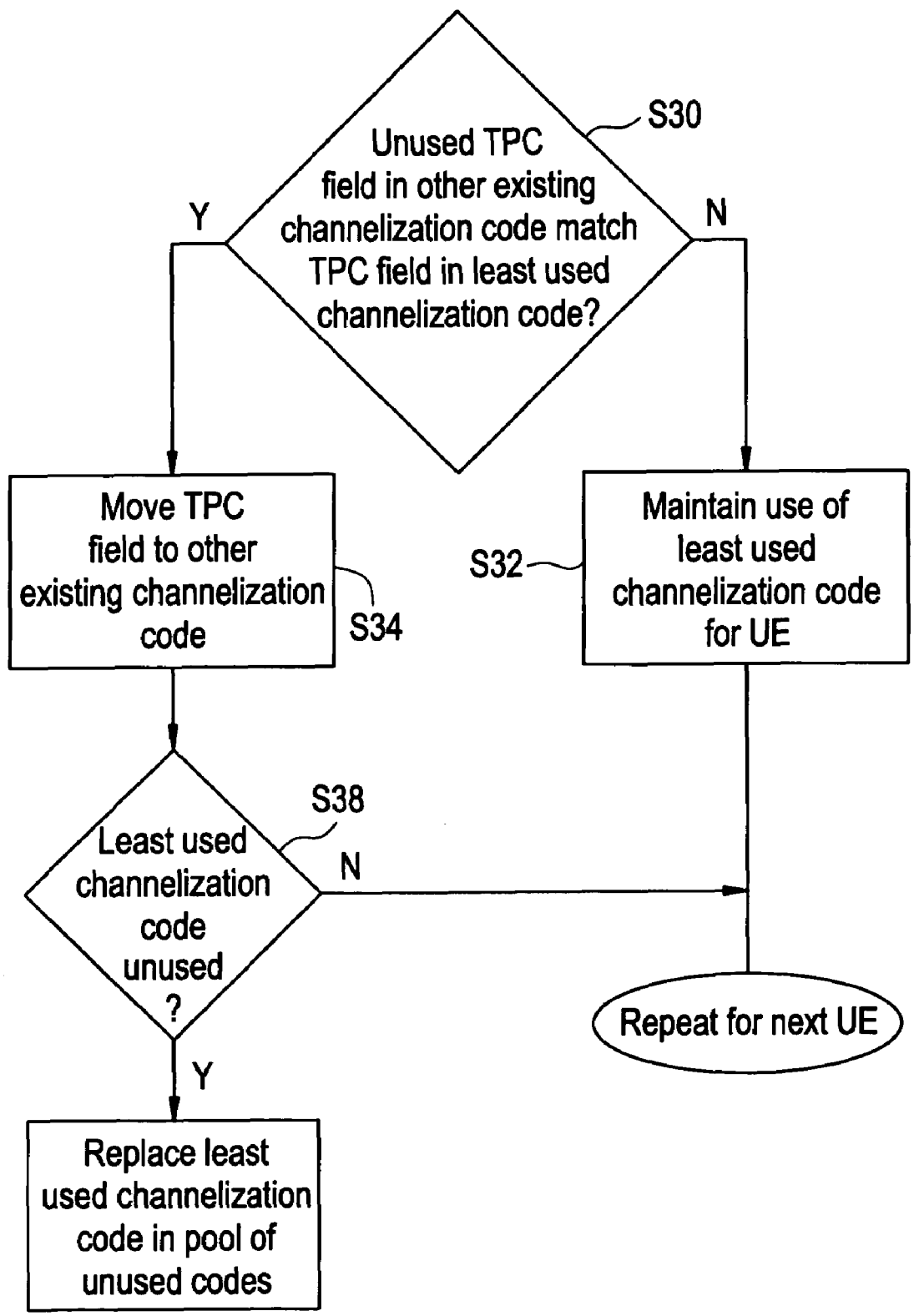

In addition to continuing to manage the channelization codes as a result of drift, the RNC continues to manage the channelization codes to minimize the number of channelization codes being used. An example of this management process is illustrated in FIG. 7. The management process illustrated in FIG. 7 is performed for each UE currently scheduled on, for example, the least used channelization code, and is performed based on the timing information obtained from the UEs, such as in step S20 discussed above. While the following process will be described as being performed for the least used channelization code, it will be understood that the process may be applied to or find equal application to the other channelization codes used by the UE. For each UE on the least used channelization code, in step S30, the RNC determines if another existing channelization code has an unused TPC field matching the timing of the TPC field for the UE on the least used channelization code. If so, then in step S34, the RNC changes the channelization code for the TPC field (e.g., F-DPCH) to the other existing channelization code. Then, in step S36, the RNC determines if the least used channelization code has become unused as a result of step S34. If so, the RNC returns the least used channelization code to the pool of unused channelization codes in step S38. If the least used channelization code is still being used, then the RNC returns to step S30 and begins the process for the next UE using the least used channelization code. Similar to step S12, the timing match occurs when the unused TPC field is received by the mobile station within a timing window (e.g., +/-148 chips) about the receipt of the used TPC field.

As discussed above, in step S30, the RNC determines if another existing channelization code has an unused TPC field matching the timing of the TPC field for the UE on the least used channelization code. If no match is found, then in step S32, the RNC maintains the present use of the least used channelization code by the UE, and begins the process for the next UE using the least used channelization code.

As discussed above, this process may then be repeated for the other channelization codes in use by the Node B.

As will be appreciated, the embodiments of the present invention provide for conserving code resources for UEs using F-DPCH while in soft handoff. Therefore F-DPCH operation in soft handoff is more efficient. The embodiments of the present invention also allow for more advanced radio resource management, which is driven by the RNC. And, a high system capacity will result from the implementation of these methods.

The invention being thus described, it will be obvious that the same may be varied in many ways. For example, while applied to time multiplexing of F-DPCH, the present invention may find equal application to managing channelization codes for other channels; or to managing other types of codes. Such variations are not to be regarded as a departure from the invention, and all such modifications are intended to be included within the scope of the invention.

We claim:

1. A method of managing use of channelization codes during soft handoff of a mobile station from a transferring network station to a candidate network station, comprising:
   determining if a transport power control (TPC) field associated with an existing channelization code used by the candidate network station is unused and meets timing criteria associated with a corresponding TPC field received by the mobile station from the transferring network station; and
   assigning a channelization code for use by the candidate network station in communicating with the mobile station based on the determining step.

2. The method of claim 1, wherein the assigning step assigns the existing channelization code if the determining step determines that a TPC field associated with the existing channelization code used by the candidate network station is unused and meets timing criteria associated with the corresponding TPC field received by the mobile station from the transferring network station.

3. The method of claim 2, wherein the timing criteria is met if an unused TPC field of the existing channelization code is received by the mobile station within a timing window established with respect to receipt of the corresponding TPC field from the transferring network station.

4. The method of claim 3, wherein the timing window is +148 chips to -148 chips with respect to receipt of the corresponding TPC field from the transferring network station.

5. The method of claim 2, further comprising:
   sending, from the candidate network station, forward link communication channel data during the TPC field of the existing channelization code if the assigning step assigns the existing channelization code.

6. The method of claim 5, wherein the forward link communication channel is a Fractional Dedicated Physical Channel.

7. The method of claim 2, wherein the assigning step assigns an unused channelization code for use by the candidate network station only if the determining step does not determine that a TPC field associated with the existing channelization code used by the candidate network station is unused and meets timing criteria associated with the corresponding TPC field received by the mobile station from the transferring network station.

8. The method of claim 1, wherein the assigning step assigns an unused channelization code for use by the candidate network station only if the determining step does not determine that a TPC field associated with the existing channelization code used by the candidate network station is unused and meets timing criteria associated with the corresponding TPC field received by the mobile station from the transferring network station.

9. The method of claim 1, wherein the timing criteria is met if an unused TPC field of the existing channelization code is received by the mobile station within a timing window established with respect to receipt of the corresponding TPC field from the transferring network station.

10. The method of claim 1, after the assigning step, further comprising:

detecting if a timing between a TPC field of the assigned channelization code that corresponds to the corresponding TPC field received by the mobile station from the transferring network station has drifted beyond an acceptable timing window with respect to the corresponding TPC field; and repeating the determining and assigning steps if the detecting step detects that the timing between the TPC field of the assigned channelization code that corresponds to the corresponding TPC field received by the mobile station from the transferring network station has drifted beyond an acceptable timing window with respect to the corresponding TPC field.

11. The method of claim 10, wherein the detecting step comprises:

determining a timing difference between the TPC field of the assigned channelization code and the corresponding TPC field received by the mobile station from the transferring network station; and detecting drift beyond an acceptable timing window if the absolute value of the timing difference exceeds a threshold amount.

12. The method of claim 1, after the assigning step, further comprising:

detecting a lack of acceptable synchronization between (i) a TPC field of the assigned channelization code that corresponds to the corresponding TPC field received by the mobile station from the transferring network station and (ii) the corresponding TPC field received by the mobile station from the transferring network station; and repeating the determining and assigning steps if the detecting step detects a lack of acceptable synchronization.

13. The method of claim 1, further comprising:

discriminating whether one channelization code used by the candidate network station has an unused TPC field that meets timing criteria associated with a corresponding used TPC field of another used channelization code used by the candidate network; and using the unused TPC field of the one channelization code instead of the used TPC field of the another used channelization code such that the used TPC field of the one channelization code becomes unused if the discriminating step determines that the another used channelization code has an unused TPC field that meets timing criteria associated with a corresponding used TPC field of the one channelization code.

14. A method of managing use of channelization codes, comprising:

discriminating whether one channelization code used by a candidate network station has an unused transport power control (TPC) field that meets timing criteria associated with a corresponding used TPC field of another used channelization code used by the candidate network; and using the unused TPC field of the one channelization code instead of the used TPC field of the another used channelization code such that the used TPC field of the one channelization code becomes unused if the discriminating step determines that the another used channelization code has an unused TPC field that meets timing criteria associated with a corresponding used TPC field of the one channelization code.

* * * * *